United States Patent
Warford et al.

(10) Patent No.: US 9,837,079 B2
(45) Date of Patent: *Dec. 5, 2017

(54) METHODS AND APPARATUS FOR IDENTIFYING FRAUDULENT CALLERS

(71) Applicant: Mattersight Corporation, Chicago, IL (US)

(72) Inventors: Roger Warford, Hoschton, GA (US); Douglas Brown, Austin, TX (US); Christopher Danson, Austin, TX (US); David Gustafson, Lake Bluff, IL (US)

(73) Assignee: MATTERSIGHT CORPORATION, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/591,768

(22) Filed: Jan. 7, 2015

(65) Prior Publication Data

US 2015/0154961 A1    Jun. 4, 2015

Related U.S. Application Data

(63) Continuation of application No. 13/673,187, filed on Nov. 9, 2012.

(51) Int. Cl.

| | |
|---|---|
| *G10L 15/20* | (2006.01) |
| *G10L 17/00* | (2013.01) |
| *G10L 25/78* | (2013.01) |
| *G10L 17/02* | (2013.01) |
| *G10L 17/04* | (2013.01) |
| *G10L 17/06* | (2013.01) |
| *G10L 25/27* | (2013.01) |

(Continued)

(52) U.S. Cl.
CPC ............ *G10L 17/005* (2013.01); *G10L 17/02* (2013.01); *G10L 17/04* (2013.01); *G10L 17/06* (2013.01); *G10L 25/27* (2013.01); *G10L 25/51* (2013.01); *G10L 25/78* (2013.01); *G10L 2025/783* (2013.01)

(58) Field of Classification Search
USPC ....... 704/246, 239, 210, 233, 244, 201, 236, 704/247, 273, 250, 231; 379/114.14; 370/516; 700/94; 380/236; 381/312

See application file for complete search history.

(56) References Cited

U.S. PATENT DOCUMENTS

| | | |
|---|---|---|
| 5,623,539 A | 4/1997 | Bassenyemukasa et al. |
| 6,078,807 A | 6/2000 | Dunn et al. |

(Continued)

OTHER PUBLICATIONS

U.S. Appl. No. 13/673,187, filed Nov. 9, 2012, Warford et al.

(Continued)

*Primary Examiner* — Neeraj Sharma
(74) *Attorney, Agent, or Firm* — Haynes and Boone, LLP

(57) ABSTRACT

The methods, apparatus, and systems described herein are designed to identify fraudulent callers. A voice print of a call is created and compared to known voice prints to determine if it matches one or more of the known voice prints, and to transaction data associated with a database of voice prints. The methods include a pre-processing step to separate speech from non-speech, selecting a number of elements that affect the voice print the most, and/or computing an adjustment factor based on the scores of each received voice print against known voice prints.

19 Claims, 3 Drawing Sheets

(51) Int. Cl.

| | | |
|---|---|---|
| *G10L 25/51* | (2013.01) | |
| *G10L 15/00* | (2013.01) | |
| *G10L 21/00* | (2013.01) | |
| *G06F 17/00* | (2006.01) | |
| *G11B 7/00* | (2006.01) | |
| *H04R 25/00* | (2006.01) | |
| *H04R 29/00* | (2006.01) | |
| *H04M 11/00* | (2006.01) | |

(56) References Cited

U.S. PATENT DOCUMENTS

| | | | |
|---|---|---|---|
| 7,403,766 B2 | 7/2008 | Hodge | |
| 7,512,221 B2 | 3/2009 | Toms | |
| 7,801,288 B2 | 9/2010 | Wasserblat et al. | |
| 7,822,605 B2 | 10/2010 | Zigel et al. | |
| 7,995,732 B2 | 8/2011 | Koch et al. | |
| 8,185,387 B1 | 5/2012 | Lachapelle | G06F 3/165 379/88.19 |
| 8,369,549 B2* | 2/2013 | Bartkowiak | H04R 25/505 381/312 |
| 8,583,432 B1 | 11/2013 | Biadsy | G10L 15/063 704/10 |
| 8,762,149 B2* | 6/2014 | Asenjo | B66B 13/26 379/114.14 |
| 8,903,052 B2 | 12/2014 | Moore et al. | |
| 9,123,339 B1* | 9/2015 | Shaw | G10L 15/22 |
| 2005/0267752 A1* | 12/2005 | Navratil | G10L 17/04 704/244 |
| 2005/0288930 A1 | 12/2005 | Shaw et al. | |
| 2006/0285665 A1* | 12/2006 | Wasserblat et al. | 379/114.14 |
| 2006/0286969 A1 | 12/2006 | Talmor et al. | |
| 2008/0195389 A1* | 8/2008 | Zhang | G10L 17/24 704/246 |
| 2008/0255842 A1* | 10/2008 | Simhi | 704/246 |
| 2008/0300877 A1 | 12/2008 | Gilbert et al. | |
| 2009/0119106 A1* | 5/2009 | Rajakumar et al. | 704/246 |
| 2009/0206993 A1 | 8/2009 | Di Mambro et al. | |
| 2010/0228656 A1 | 9/2010 | Wasserblat et al. | |
| 2010/0328035 A1 | 12/2010 | Hanley et al. | |
| 2011/0119060 A1* | 5/2011 | Aronowitz | G10L 17/02 704/250 |
| 2011/0131044 A1 | 6/2011 | Fukuda et al. | |
| 2011/0191106 A1 | 8/2011 | Khor et al. | |
| 2011/0213615 A1 | 9/2011 | Summerfield et al. | |
| 2011/0282666 A1* | 11/2011 | Washio et al. | 704/246 |
| 2011/0288866 A1* | 11/2011 | Rasmussen | H04L 12/1831 704/246 |
| 2011/0320200 A1 | 12/2011 | Broman et al. | |
| 2012/0084078 A1* | 4/2012 | Moganti | G06F 21/32 704/201 |
| 2012/0155663 A1 | 6/2012 | Weinberg et al. | |
| 2012/0166190 A1* | 6/2012 | Lee | G10L 21/0208 704/233 |
| 2012/0253805 A1* | 10/2012 | Rajakumar | H04M 15/47 704/236 |
| 2013/0132091 A1* | 5/2013 | Skerpac | G10L 17/005 704/273 |
| 2013/0238334 A1* | 9/2013 | Ma | G10L 17/04 704/244 |
| 2013/0246064 A1* | 9/2013 | Wasserblat | G10L 25/78 704/244 |
| 2014/0236593 A1* | 8/2014 | Wu | G10L 17/26 704/231 |
| 2014/0330563 A1 | 11/2014 | Faians et al. | |

OTHER PUBLICATIONS

Frederic Bimbot et al., "A Tutorial on Text-Independent Speaker Verification," Dec. 2, 2002; Aug. 3, 2003, pp. 430-451, EURASIP Journal on Applied Signal Processing 2004:4.

Joseph P. Cambell, Jr., "Speaker Recognition: A Tutorial," Sep. 1997, pp. 1437-1462, Proceedings of the IEEE, vol. 85, No. 9.

\* cited by examiner

METHODS AND APPARATUS FOR IDENTIFYING FRAUDULENT CALLERS

CROSS-REFERENCE TO RELATED APPLICATION

This application is a continuation of U.S. application Ser. No. 13/673,187 filed, Nov. 9, 2012, the contents of which is hereby incorporation in its entirety by express reference thereto.

TECHNICAL FIELD

The present disclosure generally relates to a method, apparatus, and system for detecting fraud, and more particularly to detecting fraudulent callers by determining if a particular voice print matches any one of many known voice prints.

BACKGROUND OF THE DISCLOSURE

Attempted fraud in telephonic or other oral communications is a common problem because verification of the true identity of an individual who is heard but not seen is difficult. Preventing fraud that involves financial transactions is particularly important. Typically, a calling customer must enter a personal identification number (PIN), provide a password, or answer a list of personal questions before he can proceed with a transaction. The use of these security measures, however, is not entirely foolproof because PINs, passwords, and personal information are unfortunately easily stolen and occasionally randomly guessed.

Transactions that take place over the phone thus require a more robust form of identity authentication to help verify that the caller is authorized to conduct the transaction. Thus, it is desirable to provide methods, apparatuses, and systems that provide more secure transactions over the phone.

SUMMARY

A customer calls a contact center to request that a certain transaction, e.g., transfer of funds from one account to another, closing an account, issuance of a new debit or credit card, etc., be performed. Using the customer's voice print, the contact center determines if the customer is a fraudulent caller according to an embodiment of the invention before allowing the transaction. The system, apparatus, and method disclosed herein may be used to minimize or eliminate fraud related to telephone communications, merchant communications, travel communications, cardholder communications, opening a transaction card account, closing a transaction card account, opening a related transaction account, changing demographic information related to the account, changing financial information related to the transaction card account, or any combination of these.

In one embodiment, the call is pre-processed to separate it into silent and non-silent segments. The non-silent segments are evaluated to determine which portions are speech and which are non-speech. Parameters that determine what is speech and what is non-speech are generated based on the evaluation and applied to the entire call.

In another embodiment, the customer's voice print is compared to a background model. A number of elements of the background model that most influence the creation of the customer's voice print are selected. These selected elements in the customer's voice print are then compared to matching elements of known voice prints, and it is determined if the voice print matches any of the known voice prints.

In yet another embodiment, a customer's voice print is scored against known voice prints and a background model, and an adjustment factor is calculated based on these scores and the scores of other unknown voice prints. The customer's adjustment factor places the customer's voice print on a scale with other unknown voice prints to determine the likelihood that the customer's voice print belongs to a fraudulent speaker.

Thus, the invention encompasses the following aspects. In a first aspect, the invention encompasses a method of voice print matching that includes receiving a telephonic communication, separating as first portion of the telephonic communication into silent and non-silent segments, evaluating the non-silent segments to determine which portions thereof are speech or non-speech, generating a plurality of parameters that determine what is speech and non-speech in the non-silent segments, and using the generated parameters to determine what is speech and non-speech for at least the remainder of the telephonic communication.

In a second aspect, the invention encompasses an audible fraud detection system including a node comprising a processor and a non-transitory computer readable medium operably coupled thereto, the non-transitory computer readable medium comprising a plurality of instructions stored therein that are accessible to, and executable by, the processor, wherein the plurality of instructions includes instructions that, when executed, receive a telephonic communication via a network; instructions that, when executed, separate a first portion of the communication into silent and non-silent segments; instructions that, when executed, evaluate the non-silent segments to determine which portions are speech or non-speech; instructions that, when executed, generate a plurality of parameters based on the evaluated non-silent segments that determine what is speech and non-speech; and instructions that, when executed, use the generated parameters to determine what is speech and non-speech for at least the remainder of the telephonic communication.

In a third aspect, the invention encompasses a non-transitory computer readable medium including a plurality of instructions stored therein, the plurality of instructions including instructions that, when executed, receive a telephonic communication; instructions that, when executed, separate a first portion at the beginning of the communication into silent and non-silent segments; instructions that, when executed, evaluate the non-silent segments to determine which portions are speech and non-speech; instructions that, when executed, generate a plurality of parameters based on the evaluated non-silent segments that determine what is speech and non-speech; and instructions that, when executed, use the generated parameters to determine what is speech and non-speech for at least the remainder of the telephonic communication.

In a fourth aspect, the invention encompasses a method of detecting a fraudulent speaker that includes receiving a telephonic communication, selecting a number of elements of a background model that most influence the creation of a voice print, comparing the selected elements of the voice print to matching elements of voice prints stored in a fraudster database, determining if the voice print matches any of the voice prints in the fraudster database and adding the voice print to the customer database if the selected elements of the voice print did not match any voice print in the fraudster database.

In a fifth aspect, the invention encompasses an audible fraud detection system that includes a node comprising a processor and a non-transitory computer readable medium operably coupled thereto, the non-transitory computer readable medium including a plurality of instructions stored therein and being accessible to, and executable by, the processor, where the plurality of instructions includes: instructions that, when executed, receive a voice audio communication from a telephonic communication via a network; instructions that, when executed, select a number of elements of a background model that most influence creation of a voice print to create a voice print from the voice audio communication; instructions that, when executed, compare a plurality of selected elements of the voice print to matching elements of one or more stored voice prints stored in a fraudster database; and instructions that, when executed, determine if the voice print matches any stored voice print in the fraudster database; and adding the voice print to the customer database if the selected elements of the voice print did not match any voice print in the fraudster database.

In a sixth aspect, the invention encompasses a non-transitory computer readable medium including a plurality of instructions stored therein, the plurality of instructions including: instructions that, when executed, receive a voice audio communication through a telephonic communication; instructions that, when executed, select a number of elements of a background model that most influence creation of a voice print to create a voice print from the voice audio communication; instructions that, when executed, compare the selected elements of the voice print to matching elements of one or more stored voice prints in a fraudster database; instructions that, when executed, determine if the voice print matches any of the stored voice prints in the database; and adding the voice print to the customer database if the selected elements of the voice print did not match any voice print in the fraudster database.

In a seventh aspect, the invention encompasses a method of detecting a fraudulent speaker, which includes creating a voice print from a received telephonic communication, comparing the voice print to a background model, scoring the voice print against one or more voice prints that are stored in the database, calculating an adjustment factor based on the scores of the voice print against the stored voice prints and the scores of other unknown voice prints against the stored voice prints, and comparing the adjustment factor of the voice print to adjustment factors of the other unknown voice prints to determine the probability that the voice print belongs to a fraudulent speaker.

In an eighth aspect, the invention encompasses an audible fraud detection system, which includes a node including a processor and a non-transitory computer readable medium operably coupled thereto, the non-transitory computer readable medium comprising a plurality of instructions stored therein that are accessible to, and executable by, the processor, where the plurality of instructions includes: instructions that, when executed, receive a telephonic communication via a network and create a voice print; instructions that, when executed, score the voice print against stored voice prints in a database; instructions that, when executed, computes an adjustment factor for each telecommunication received that is based on the score of each voice print compared to the scores of each of the stored voice prints; and instructions that, when executed, compare the adjustment factors to determine which voice print is from a fraudulent speaker.

In a ninth aspect, the invention encompasses a non-transitory computer readable medium including a plurality of instructions stored therein, the plurality of instructions including: instructions that, when executed, receive a telephonic communication; instructions that, when executed, compare a voice print created from the communication to voice prints stored in a database to create a score for each voice print instructions that, when executed, compute an adjustment factor based on the score of each voice print against stored voice prints; and instructions that, when executed, compare the adjustment factors to determine which voice print is a fraudster. Various embodiments described and claimed herein may be suitably used alone or in combination in various of these aspects.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

Figure 1:
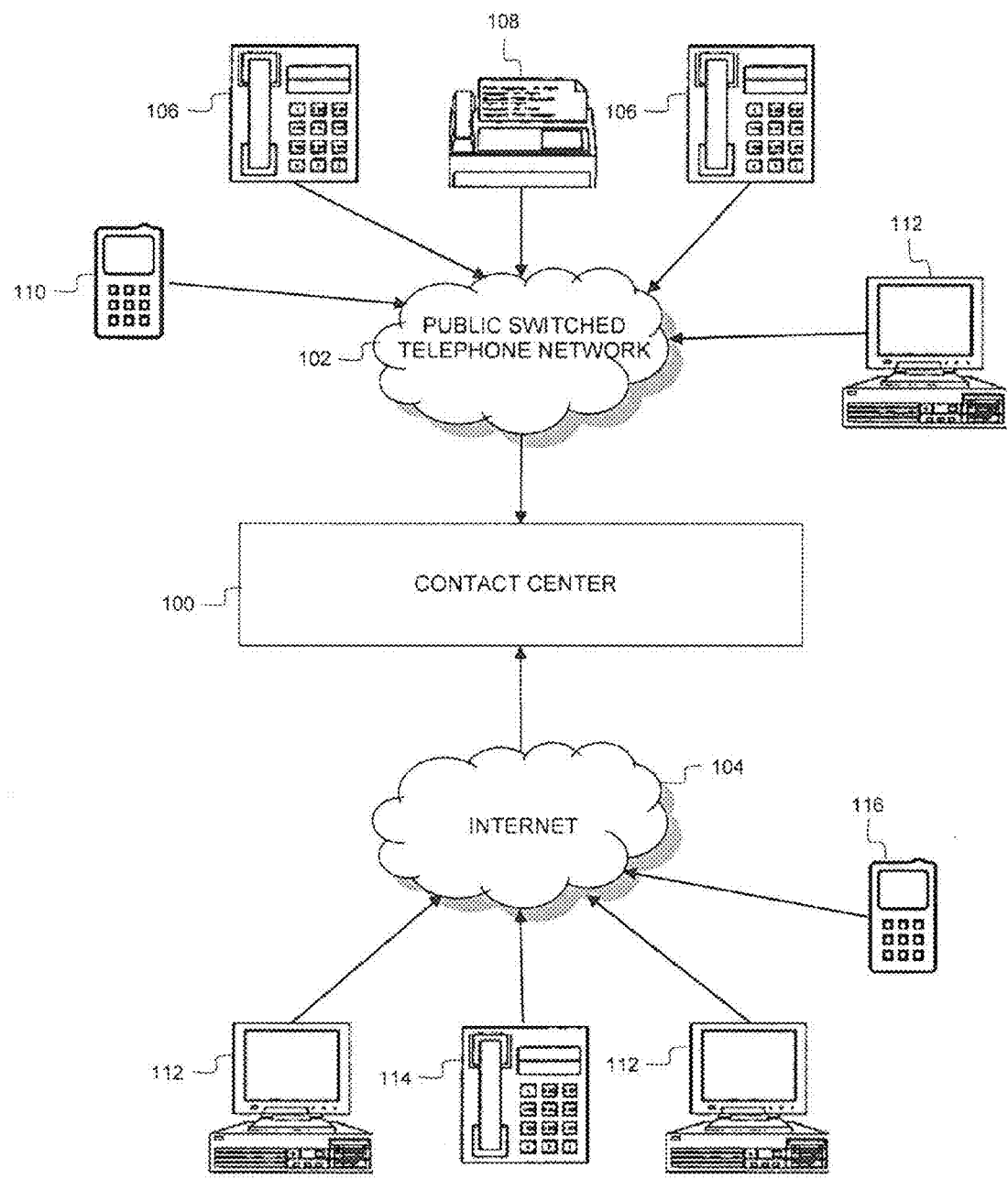
FIG. 1 is a simplified block diagram of an embodiment of a contact center according to various aspects of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a simplified block diagram of an embodiment of a contact center 100 according to various aspects of the present disclosure. A "contact center" as used herein can include any facility or system server suitable for receiving and recording electronic communications from customers. Such communications can include, for example, telephone calls, facsimile transmissions, e-mails, web interactions, voice over IP ("VoIP") and video. Various specific types of communications contemplated through one or more of these channels include, without limitation, email, SMS data (e.g., text), tweet, instant message, web-form submission, smartphone app, social media data, and web content data (including but not limited to Internet survey data, blog data, microblog data, discussion forum data, and chat data), etc. In various aspects, real-time communication, such as voice, video, or both, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to receive and record varying electronic communications and data formats that represent an interaction that may occur between a customer (or caller) and a contact center agent during fulfillment of a customer and agent transaction. In one embodiment, the contact center 100 records all of the customer calls in uncompressed audio formats. In the illustrated embodiment, customers may communicate with agents associated with the contact center 100 via multiple different communication networks such as a public switched telephone network (PSTN) 102 or the Internet 104. For example, a customer may initiate an interaction session through traditional telephones 106, a fax machine 108, a cellular (i.e., mobile) telephone 110, a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs).

Figure 2:
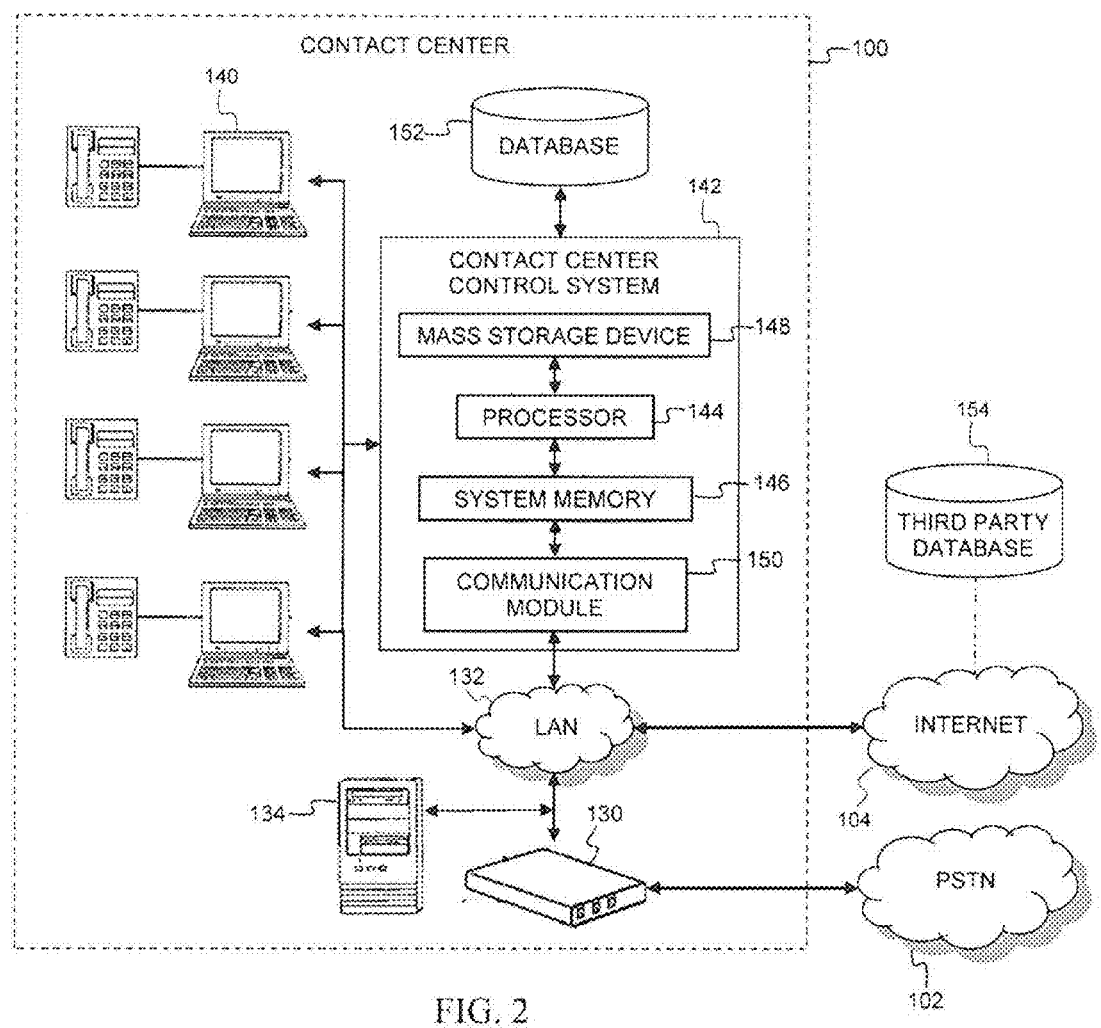
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN 132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP phone or computer within the contact center 100.

The contact center 100 is further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

As shown in FIG. 2, the contact center 100 includes a plurality of agent workstations 140 that enable agents employed by the contact center to engage in customer interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the customer, respond to email inquiries, receive faxes, engage in instant message conversations, respond to website-based inquires, video chat with a customer, and otherwise participate in various customer interaction sessions. Further, in some embodiments, the agent workstations 140 may be remotely located from the contact center 100, for example, in another city, state, or country.

The contact center 100 further includes a contact center control system 142 that is generally configured to provide recording, voice analysis, behavioral analysis, storage, and other processing functionality to the contact center. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, as central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The processor 144 is configured to analyze voice prints and run various algorithms that facilitate the detection of fraudulent callers. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data, such as known voice prints, may be stored on the mass storage device 148. Examples of mass storage devices may include hard discs, optical disks, magneto-optical discs, solid-state storage devices, tape drives, CD-ROM drives, and/or a variety other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze customer voice data and other structured and unstructured data to facilitate identifying a fraudulent caller, and other tools may be used in association therewith to increase efficiency and efficacy of the contact center. As an aspect of this, the control system 142 is operable to record unstructured interactions between customers and agents occurring over different communication channels including without limitation telephone conversations, email exchanges, website postings, social media communications, smartphone application (i.e., app) communications, fax messages, instant message conversations. For example, the control system 142 may include a hardware or software-based recording server to capture the audio of a standard or VoIP telephone connection established between an agent workstation 140 and an outside customer telephone system. Further, the audio from an unstructured telephone call or video conference session may be transcribed manually or automatically and stored in association with the original audio or video. In one embodiment, multiple communication channels (i.e., multi-channel) may be used according to the invention, either in real-time to collect information, for evaluation, or both. For example, control system 142 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 142 is configured to captured structured data related to customers, agents, and their interactions. For example, in one embodiment, a "cradle-to-grave" recording may be used to record all information related to a particular telephone call from the time the call enters the contact center to the later of: the caller hanging up or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific customers may be collected and associated with each customer, including without limitation the number and length of calls placed to the contact center, call origination information, reasons for interactions, outcome of interactions, average hold time, agent actions during interactions with customer, manager escalations during calls, types of social media interactions, number of distress events during interactions, survey results, and other interaction information. In addition to collecting interaction data associated with a customer, the control system 142 is also operable to collect biographical profile information specific to a customer including without limitation customer phone number, account/policy numbers, address, employment status, income, gender, customer "value" data (i.e., customer tenure, money spent as customer, etc.), personality type (as determined by past interactions), and other relevant customer identification and biological information. The control system 142 may also collect agent-specific unstructured and structured data including without limitation agent personality type, gender, language skills, performance data (e.g., customer retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different interaction data, customer data, agent data, and telephony data may be collected and processed by the control system 142.

The control system 142 may store recorded and collected interaction data in a database 152. In one embodiment, the database 152 stores the voice prints of the customers who have called contact center 100 in an uncompressed audio format. The database may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third party database 154. The third party database 154 may be, for example, a library of known voice prints of fraudulent callers or a library of voice prints of one gender. In certain embodiments, the control system 142 may query the third party database for customer data such as credit reports, past transaction data, and other structured and unstructured data.

The multi-channel interaction data collected in the context of the control center 100 may be subject to a linguistic-based psychological behavioral model to assess the personality of customers and agents associated with the interactions. For example, such a behavioral model may be applied to the transcription of a telephone call, instant message conversation, or email thread, between a customer and agent to gain insight into why a specific outcome resulted from the interaction. In one embodiment, interaction data is mined for behavioral signifiers associated with a linguistic-based psychological behavioral model. In particular, the contact center control system 142 searches for and identifies text-based keywords (i.e., behavioral signifiers) relevant to a predetermined psychological behavioral model. In a preferred embodiment, multi-channels are mined for such behavioral signifiers.

Figure 3:
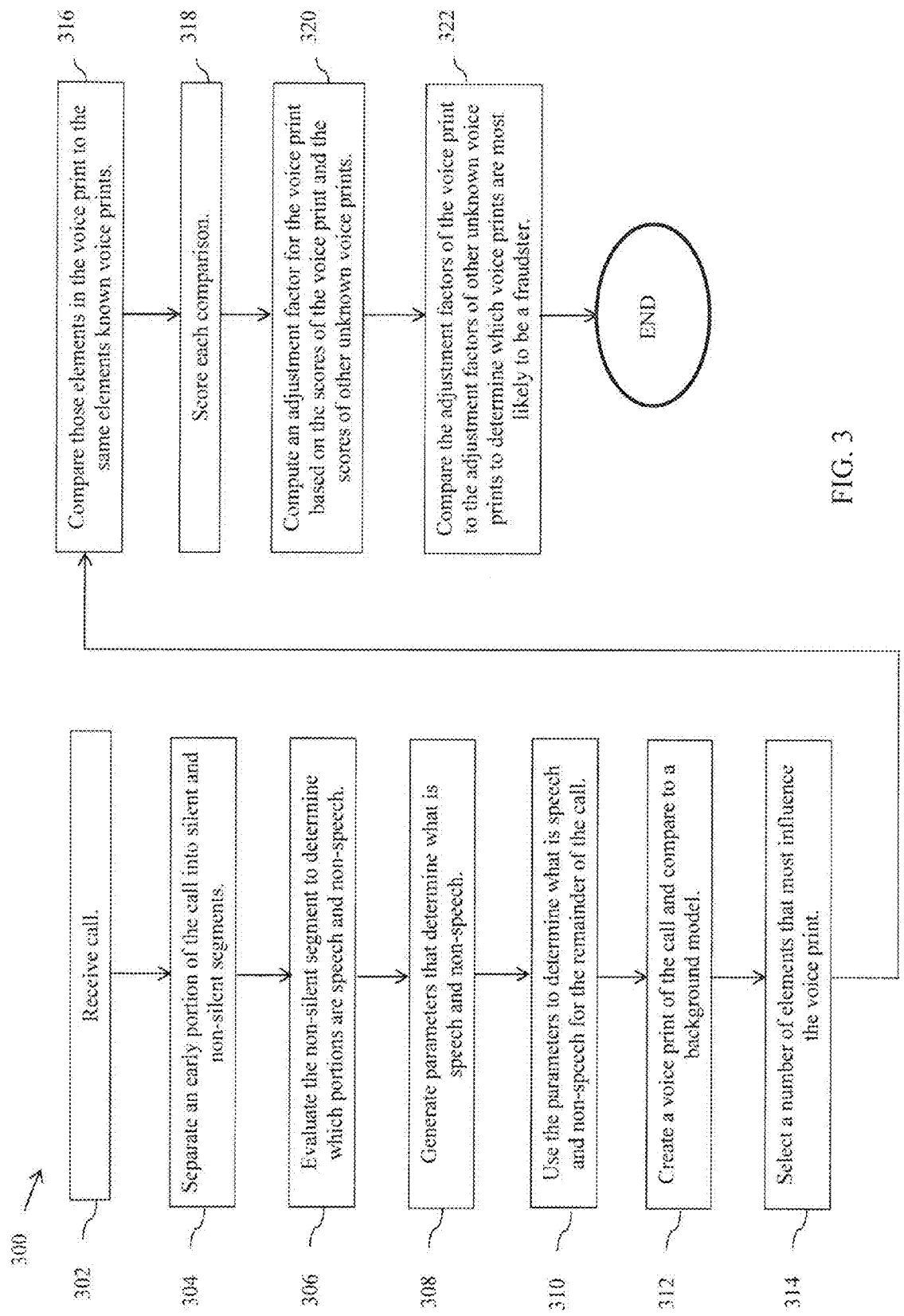
FIG. 3 is a flowchart illustrating a preferred method of detecting a fraudulent caller according to aspects of the present disclosure.

FIG. 3 illustrates a preferred, exemplary embodiment of a method 300 for detecting a fraudulent caller according to the present disclosure. Method 300 can be implemented in, for example, software modules for execution by control system 142.

Method 300 begins at step 302, when a customer calls a particular entity, such as contact center 100, and control system 142 receives the call. Control system 142 is configured to receive voice audio communications, including telephone calls, video, and VoIP over any suitable voice channel, or combination of voice channels. The term "customer" is used for exemplary purposes and is intended to include an type of caller (e.g., merchant, travel agent, cardholder, agent of cardholder, processor, administrator, and/or the like) and any type of communication (e.g., human or electronic voice). The call may be received in "real-time" or the call may be a previously stored call that is forwarded to contact center 100.

Control system 142 typically immediately processes the customer's call upon receipt and provides results back to the agent. In one embodiment, control system 142 sends a report to the agent while the agent is still engaged in a telephone call with the customer. Alternatively, the call may be stored for later processing and optionally processed with a group of other calls.

Most voice recognition systems determine what parts of the call are speech and what parts are non-speech. Once the call is received, however, method 300 proceeds to pre-processing as in step 304. Pre-processing optionally includes any one or more of the following: decompression in case the voice is compressed; separating the speakers; and selecting one of the sides if the two (or more) speakers were captured together, for example the customer side in a telephone call between a customer and a service center.

In step 304, pre-processing includes taking an early portion of the call, e.g., the first about 10 seconds to 2 minutes of the call, preferably the first about 20 to 60 seconds or about 30 to 50 seconds, and separating the call into silent and non-silent segments. Method 300 does not assume that silence occurs only at the very start of a call, but rather that silence occurs sometime during this early portion. The term "about," as used herein, should generally be understood to refer to both numbers in a range of numerals. Moreover, all numerical ranges herein should be understood to include each whole integer within the range, e.g., about 35 to 65 would include at least 35, 36, 37, etc. as well as sub-ranges, e.g., 40 to 60, 45 to 55, 42 to 58, etc.

Once the non-silent segments are isolated, control system 142 evaluates the non-silent segment to determine which portions are speech and which are non-speech in step 306. Non-speech typically includes background or ambient room noise. Step 306 uses a "clustering approach," i.e., all non-speech sounds are treated substantially the same. For example, the clustering approach assumes that all non-speech in the call sounds about the same and groups these call sounds together. Speech is treated differently from non-speech.

Method 300 continues to step 308, where parameters are generated to determine what is speech and what is non-speech. Control system 142 analyzes the speech and non-speech portions and returns a set of parameters that determines which category a portion of the call falls into. Speech can thus be more accurately identified in each call.

Every call that is received by contact center 100 receives its own parameters, and these parameters are automatically adjusted on a call-by-call basis. Each call is treated differently because every call is unique and the same set of parameters cannot be applied to each call while maintaining accuracy. For example, different customers and different call centers have different recording conditions. Even in the same call center, every call is different. By way of example, customers use different handsets and that may generate different amounts of noise and agents are located closer to or further from an HVAC output or vent.

The generated parameters are applied to the remainder of the call in step 310 to fully separate speech from non-speech. All non-speech portions are removed using an automatic algorithm for speech and non-speech detection. A different algorithm is used if the call is all silent.

Continuing to step 312, control system 142 creates a voice print from the speech portions of the call. The term "voice print," as used herein, means a representation of a human voice that uniquely identifies an individual. In one embodiment, a voice print is an electronically recorded graphic representation of a person's voice. Typically, a voice print represents a set of measurable characteristics of a human voice. Like a fingerprint, a voice print for any individual is distinctive.

Control system 142 extracts at least a portion of the customer's voice to create a customer voice print, typically in digital form for computer processing. Characteristic, i.e., person-dependent, features from the customer's voice are extracted from the call, thus generating one or more sequences of feature vectors. The one or more sequences of feature vectors are used to construct a customer voice print, and the voice print may subsequently be stored. The goal of feature selection is to find a transformation of the customer's voice that preserves the more pertinent information to identifying the customer's voice (or at least uniquely categorizing it) while enabling meaningful comparisons to be performed using simple measures of similarity.

Once the customer voice print is created, it may be stored in compressed or uncompressed form. The customer voice print is compared to a background model, e.g., the Universal Background Model (UBM). The UBM is a speaker-independent Gaussian Mixture Model trained with speech samples from a large set of speakers to represent general speech characteristics. The UBM is a large model (2048 elements for both genders and 1024 elements for each gender). The background model may be constructed from multiple relevant voices, including without limitation known customers' voices, voices of the same gender, voices in the same age group, or the like. The background model used should reflect the type, quality, and composition of the customer. For example, if the customer is known to be a male using a telephone, the background model would be trained using telephone speech from a pool of male speakers. In the case where the gender of the customer is not known, the background model would be trained using speech from both male and female speakers. In one embodiment, the gender of the customer is determined and an appropriate background model is selected for comparison.

Moving to step 314, control system 142 dynamically selects a number of elements of the background model that most influence the customer voice print, i.e., the elements that influence the scoring (discussed below) of the voice print the most. The elements should be those that most define and characterize the customer voice print. The elements selected are thus personal to the customer voice print. Different customers will have different elements selected, and even the same customer may have different elements selected on successive contacts with the control center. The number of elements may be any suitable number to facilitate identification of a customer, but typically less than 100, preferably less than 70, and more preferably less than 50 elements. In one embodiment, about 10 to 30, and preferably about 12 to 20 elements are selected for voice print comparison with known voice prints.

Once these elements are chosen, method 300 proceeds to step 316, where the selected best elements of the customer voice print are compared to the same elements in known voice prints to check for a match. In one embodiment, the known voice prints are those of the appropriate gender, i.e., the same gender as the customer. By comparing only those best elements, processing time and processing power are significantly reduced without sacrificing accuracy. In other words, instead of using an algorithm that compares the customer voice print to all the elements of the known voice prints, the algorithm implemented herein compares a smaller number of elements, which preferably results in substantially faster processing times. As the number of known voice prints grows, this allows control system 142 to still identify the customer voice efficiently in real-time while the customer remains on the call.

In a number of embodiments, the known voice prints are stored in a database or library. The library can store the known voice prints in any particular data structure and format. The library can also associate other information with each of the known voice prints, such as an identification of the person corresponding with each voice print and characteristics of the person. For example, the characteristics can include the types of fraudulent transactions attempted by the corresponding person, the number of times fraud was attempted, etc. Any databases discussed herein may be any type of database, such as relational, hierarchical, object-oriented, and/or the like.

The known voice prints represent electronic recordings of persons having a particular known characteristic. For example, the known voice prints can correspond with persons known to have engaged in attempted fraudulent transactions. Alternatively, the characteristic for the known voice prints may relate to other factors or criteria.

Control system 142 may perform one-to-few, e.g., 1 to about 5 to 10 or one-to-many, e.g., 1 to about 50 to 100 (or more if selected) comparisons of customer voice prints with known voice prints to identify any matches between them, or at least a probability of a match, meaning that the customer voice print and one of the known voice prints are likely from the same person. The identification of any matches can be used for a variety of purposes, such as determining whether to authorize a transaction requested by the customer. By comparing the customer voice print with the multiple known voice prints, that are, for example, associated with persons having attempted fraudulent transactions, the system 142 can determine whether this customer is likely attempting to fraudulently interact with another person's account.

Testing a voice sample against fraudsters' voice prints is, in one embodiment, extremely fast. Therefore, the probability of fraud can be available shortly after an interaction was executed, or even before it ended, thus limiting further damage by closing the account, canceling the account, suspending the account, placing a fraud alert on the account to increase the scrutiny of further account access for a period of time or until a triggering event such as a call from the true customer, or the like.

In step 318, the comparison of the customer voice print with each known voice print and the background model is scored. Algorithms are known in the art for performing this type of comparison and can include, for example, statistical analysis between voice prints. This comparison is typically performed sequentially between the customer voice print and each of the known voice prints. The scoring step generates a probability that the customer voice print belongs to one or more known speakers. In the case where the known speakers are fraudulent speakers, the probability is the likelihood that the customer is a fraudulent speaker. The scores that meet a threshold score are isolated and may be further analyzed.

If the score is below a certain threshold, there is a significant probability that the person involved in the interaction is not the same person for which an earlier interaction was recorded. The customer's voice characteristics may be scored against a library of voice prints of known fraudsters. Additionally or alternatively, the customer voice print may be scored against one or more voice prints that are selected as having similar characteristics with the customer's voice sample.

The minimum threshold that typically must be reached before a notification or alert is issued for an interaction depends on the resources the user is willing to dedicate to checking the alerts on one hand, and on the implications of unhandled identity thefts on the other hand. Other factors considered in setting the thresholds may include considering the status of the customer, the status of the interaction, the importance, frequency, or the volume of the interaction, the sensitivity of the interaction to the organization, the relative frequency of interactions of the same order of magnitude in the account as well as variations in the same, the sensitivity of the account or the account holder, or the like. For example, a large transaction of a VIP customer in a financial institution will be assigned lower thresholds than other transactions, to increase the catching probability of a fraud attempt. In general, the more important the interaction or the customer, the lower the thresholds are set, so that fraud attempts are more likely to be caught. The thresholds are preferably set in a dynamic manner according to interaction metadata and data collected from the interaction itself. The fields, as well as the values, according to which the thresholds are set, can be determined dynamically.

The threshold is preferably a dynamic one that should typically not be strictly interpreted as a rigid percentage or threshold. As an example, if a voice print is common and similar to many others, a higher certainty may be necessary to establish a substantial match, whereas a unique or uncommon voice print may require a lower certainty to establish a substantial match. Finding a substantial match can mean a dynamic, sliding scale of certainty based on factors that may include the type of voice and the level of certainty of the match in the fraudulent voice print database.

Method 300 further includes a normalization step for generating score normalization parameters to be used when scoring one or more customer voice prints against one or more known voice prints. Control system 142 preferably further grades the probabilities resulting from scoring a customer's voice sample against the one or more known voice prints to facilitate the determination of which unknown voice print is most likely to be fraudulent.

In step 320, an adjustment factor is computed. Control system 142 takes all of the comparison scores for the customer voice print and computes an adjustment factor for that customer based on those scores and the scores of other unknown voice prints. The adjustment factor scales the score of the customer voice print in a range so that one can accurately compare unknown voice prints and determine whether the call is fraudulent or not.

Proceeding to step 322, the adjustment factor of the customer voice print is compared to adjustment factors of other unknown voice prints to determine which voice prints are most likely to belong to a fraudulent caller. The adjustment factors scale the score in a range so that one can accurately compare scores from call to call, and determine whether the call is likely to be a fraudulent caller or not. In this way, calls which are more likely to be fraudulent are readily identified and can receive appropriate attention from contact center agents and managers.

All the voice print analysis and results may be stored in control system 142 and can be accessed by a user, such as a customer service representative supervisor, for subsequent review. In certain embodiments, the user can find and flag recent calls as fraud. In other embodiments, the user can find related calls by searching by phone number or account number. Callers that are identified as fraudsters can be flagged to facilitate creating a new voice print.

A database containing fraudulent speakers can be continually updated to include newly discovered fraudulent voice prints. A continually updated database prevents known imposters from stealing or perpetuating fraud. Once a "bad" voice print is placed in the database, that unauthorized voice cannot be used in future transactions. A dynamically updated database creates an additional layer of security and deterrence against repeat offenders.

The systems, apparatuses, and methods described herein increase the efficiency and ability to identify a fraudulent caller. The systems, apparatuses, and methods enable users to focus on those interactions where fraud poses a significant threat to their business, for example opening a new account, changing details of an existing account, expanding account credit balance, upgrading an account, or the like.

The foregoing outlines features of several embodiments so that a person of ordinary skill in the art may better understand the aspects of the present disclosure. Such features may be replaced by any one of numerous equivalent alternatives, only some of which are disclosed herein, one of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

What is claimed is:

1. An audible fraud detection system, comprising:
a node comprising a processor and a non-transitory computer readable medium operably coupled thereto, the non-transitory computer readable medium comprising a plurality of instructions stored therein that are accessible to, and executable by, the processor, wherein the plurality of instructions comprises:
instructions that, when executed, receive a telephonic communication from an unidentified caller via a network;
instructions that, when executed, separate a first portion of the communication into silent and non-silent segments;
instructions that, when executed, evaluate the non-silent segments to determine which portions are speech or non-speech;
instructions that, when executed, generate a plurality of parameters based on the evaluated non-silent segments that determine what is speech and non-speech;
instructions that, when executed, use the generated parameters to determine what is speech and non-speech for at least the remainder of the telephonic communication;
instructions, that when executed, create a voice print from the speech portions of the telephonic communication;
instructions, that when executed, compare the voice print to a Universal Background Model (UBM);
instructions, that when executed, select a number of audio elements of the UBM that characterize the voice print of the unidentified caller relative to other audio elements of the UBM;
instructions, that when executed, select audio elements of the voice print that correspond to the selected audio elements of the UBM; and
instructions, that when executed, compare the selected audio elements of the voice print to matching audio elements of a plurality of recorded voice prints from a plurality of fraudulent speakers to determine whether the voice print belongs to a fraudulent speaker.

2. The system of claim 1, wherein the first portion comprises a pre-selected time period.

3. The system of claim 1, wherein the plurality of parameters are generated for each communication received.

4. The system of claim 1, wherein the instructions that, when executed, evaluate the non-silent segments comprise instructions to group all non-speech sounds together.

5. A non-transitory computer readable medium comprising a plurality of instructions stored therein, the plurality of instructions comprising:
instructions that, when executed, receive a telephonic communication from an unidentified caller;
instructions that, when executed, separate a first portion at the beginning of the communication into silent and non-silent segments;
instructions that, when executed, evaluate the non-silent segments to determine which portions are speech and non-speech;
instructions that, when executed, generate a plurality of parameters based on the evaluated non-silent segments that determine what is speech and non-speech;

instructions that, when executed, use the generated parameters to determine what is speech and non-speech for at least the remainder of the telephonic communication;

instructions, that when executed, create a voice print from the speech portions of the telephonic communication;

instructions, that when executed, compare the voice print to a Universal Background Model (UBM);

instructions, that when executed, select a number of audio elements of the UBM that characterize the voice print of the unidentified caller relative to other audio elements of the UBM;

instructions, that when executed, select audio elements of the voice print that correspond to the selected audio elements of the UBM; and instructions that, when executed, compare the selected audio elements of the voice print to matching audio elements of a voice print associated with a caller from a previous communication to determine whether the voice print belongs to a fraudulent speaker.

6. The non-transitory computer readable medium of claim 5, wherein the first portion comprises a pre-selected time period.

7. The non-transitory computer readable medium of claim 5, wherein the plurality of parameters are generated for each communication received.

8. The non-transitory computer readable medium of claim 5, wherein the instructions that, when executed, evaluate the non-silent segments, comprise instructions to group all non-speech together.

9. A method of detecting a fraudulent speaker comprising:
receiving a telephonic communication from an unidentified caller;
separating a first portion of the telephonic communication into silent and non-silent segments;
evaluating the non-silent segments to determine which portions thereof are speech or non-speech;
generating a plurality of parameters that determine what is speech and non-speech in the non-silent segments;
using the generated parameters to determine what is speech and non-speech for at least the remainder of the telephonic communication;
comparing the speech of the unidentified caller to a Universal Background Model (UBM);
selecting a number of audio elements of the UBM that most characterize the creation of a voice print of the unidentified caller relative to other audio elements of the UBM;
selecting audio elements of the voice print that correspond to the selected audio elements of the UBM;
comparing the selected audio elements of the voice print to matching audio elements of voice prints stored in a fraudster database;
determining if the voice print matches any of the voice prints in a customer database; and
adding the voice print to the customer database if the selected audio elements of the voice print did not match any voice print in the fraudster database.

10. The method of claim 9 wherein the number of selected audio elements of the UBM is from about 10 to 30.

11. The method of claim 9, which further comprises identifying the gender of the speaker in a voice print.

12. The method of claim 11, which further comprises accessing a library of voice prints for the identified gender.

13. The method of claim 9, wherein the voice prints in the fraudster database comprise voice prints of at least a plurality of fraudulent speakers.

14. The method of claim 13, wherein determining if the voice print matches any of the voice prints in the customer database comprises:
scoring a group of telephonic communications within a range of probabilities that a match exists; and
isolating communications with a score above a pre-selected match-probability threshold.

15. An audible fraud detection system, comprising:
a node comprising a processor and a non-transitory computer readable medium operably coupled thereto, the non-transitory computer readable medium comprising a plurality of instructions stored therein and being accessible to, and executable by, the processor, where the plurality of instructions comprises:
instructions that, when executed, receive a voice audio communication from a telephonic communication from an unidentified caller via a network;
instructions that, when executed, separate a first portion of the voice audio communication into silent and non-silent segments;
instructions that, when executed, evaluate the non-silent segments to determine which portions are speech or non-speech;
instructions that, when executed, generate a plurality of parameters based on the evaluated non-silent segments that determine what is speech and non-speech;
instructions that, when executed, use the generated parameters to determine what is speech and non-speech for at least the remainder of the voice audio communication;
instructions that, when executed, compare the speech of the unidentified caller to a Universal Background Model (UBM);
instructions that, when executed, select a number of audio elements of the background model that most characterize creation of a voice print of the unidentified caller relative to other audio elements of the background model to create a voice print from the voice audio communication;
instructions that, when executed, select audio elements of the voice print that correspond to the selected audio elements of the UBM;
instructions that, when executed, compare a plurality of the selected audio elements of the voice print to matching audio elements of one or more stored voice prints stored in a fraudster database;
instructions that, when executed, determine if the voice print matches any stored voice print in the fraudster database; and
instructions that, when executed, add the voice print to the customer database if the selected elements of the voice print did not match any voice print in the fraudster database.

16. The system of claim 15, wherein the number of selected audio elements of the UBM is from about 10 to 30.

17. The system of claim 15, further comprising instructions that, when executed, identify the gender of the voice print.

18. The system of claim 15, wherein the stored voice prints in the database comprise at least voice prints of a plurality of fraudulent speakers.

19. The system of claim 15, wherein the instructions that, when executed, determine if the voice print matches any of the stored voice prints in the customer database, comprise:
instructions to score a group of telephonic communications within a range or probabilities that a match exists; and isolate communications with a score above a pre-selected match-probability threshold.

\* \* \* \* \*